United States Patent [19]

Okamoto et al.

[11] Patent Number: 4,917,004
[45] Date of Patent: Apr. 17, 1990

[54] ROBOT TRAVELING DUCT FOR CLEAN ROOM

[75] Inventors: Kenji Okamoto; Yoshiyuki Iwasawa, both of Tokyo, Japan

[73] Assignee: Shimizu Construction Co., Ltd., Tokyo, Japan

[21] Appl. No.: 311,914

[22] Filed: Feb. 17, 1989

[30] Foreign Application Priority Data

Feb. 18, 1988 [JP] Japan .................. 63-36292

[51] Int. Cl.⁴ .............................. F24F 9/00
[52] U.S. Cl. .................... 98/40.1; 55/385.2; 98/31.5; 98/115.3; 901/50
[58] Field of Search ............... 98/31.5, 31.6, 33.1, 98/34.5, 34.6, 36, 40.1, 40.11, 115.3; 55/385.2, 484; 901/50

[56] References Cited

FOREIGN PATENT DOCUMENTS

| 138635 | 6/1987 | Japan | 98/36 |
| 288431 | 12/1987 | Japan | 98/36 |
| 86/03158 | 6/1986 | World Int. Prop. O. | 901/50 |

Primary Examiner—Harold Joyce
Attorney, Agent, or Firm—Cushman, Darby & Cushman

[57] ABSTRACT

A robot traveling duct for clean room in which a vertical laminar flow of air is produced from a ceiling filter toward a floor thereof, and in which the robot traveling duct is arranged within the clean room and below the ceiling filter and surrounds a guide rail of the robot, the robot traveling duct including a longitudinal opening for connection between the guide rail and the robot. The robot traveling duct includes a first enclosure for enclosing the guide rail to extend along the guide rail, the first enclosure having an air intake system for introducing air, issuing from the ceiling filter, into the first enclosure. The robot traveling duct further includes a second enclosure mounted to the first enclosure to be located below the first enclosure, the second enclosure including a second enclosure filter for filtering air therein and allowing the filtered air to go downwards into the clean room, the second enclosure extending along the guide rail and being equal in width to the first enclosure. The robot traveling duct is further provided with an air forcing mechanism for forcing air from the first enclosure into the second enclosure, whereby a laminar air flow is substantially produced just below the second enclosure means by actuating the air forcing mechanism.

5 Claims, 6 Drawing Sheets

ROBOT TRAVELING DUCT FOR CLEAN ROOM

BACKGROUND OF THE INVENTION

The present invention relates to a robot traveling duct for a clean room, particularly but not exclusively a clean room for semiconductors, using a vertical laminar flow of air.

FIG. 1 illustrates a typical example of the semiconductor clean room C, using the prior art robot traveling duct. In the ceiling room, a high performance ceiling filter 1, such as HEPA (High Efficiency Particulate Air) filter, ULPA (Ultra Low Penetration Air) filter or the like filter, is provided to the whole ceiling for producing a vertical laminar flow of filtered air from the ceiling towards the floor of the clean room. In the robot traveling duct, the guide rail 3 of the robot 2 is supported on poles on the floor or suspended from the ceiling and is surrounded with a guide rail duct 5 along the overall length thereof. Semiconductor production units are located below the traveling path of the robot 2. The guide rail duct has a plurality of slits 6 for passing a connecting portion 2A of the robot, the connecting portion 2A slidably engaging with the guide rail 3. The inside of the guide rail duct 5 is evacuated by a conventional evacuating unit, not shown, so that cleaned air from the ceiling filter 1 is drawn through the slits 6 into the guide rail duct 5, from which it is sent to the evacuating unit, whereby dust which is produced due to the slidable contact between the robot connection portion 2A and the guide rail 3 is entrained in the air stream from the guide rail duct to the evacuating unit for preventing the dust from scattering in the clean room C.

In the prior art robot traveling duct, the vertical laminar flow of the filtered air from the ceiling filter 1 is disturbed blow it as shown by arrows in FIG. 1. When the disturbance of the laminar flow is large, dust in the filtered air is scattered in a wide area. This is not preferable for maintaining a superclean room.

Accordingly, it is an object of the present invention to provide a robot traveling duct which is capable of effectively preventing the vertical laminar flow of air from being disturbed below it.

SUMMARY OF THE INVENTION

In view of this and other objects, the present invention provides a robot traveling duct for clean room in which a vertical laminar flow of air is produced from a ceiling filter toward a floor thereof, and in which the robot traveling duct is arranged within the clean room and below the ceiling filter and surrounds a guide rial of the robot, the robot traveling duct including a longitudinal opening for connection between the guide rail and the robot. The robot traveling duct includes a first enclosure for enclosing the guide rial to extend along the guide rail, the first enclosure having an air intake for introducing air, issuing from the ceiling filter, into the first enclosure. The robot traveling duct further includes a second enclosure mounted to the first enclosure to be located below the first enclosure, the second enclosure including a second enclosure filter for filtering air therein and allowing the filtered air to go downwards into the clean room, the second enclosure extending along the guide rail and being equal in width to the first enclosure. The robot traveling duct is further provided with an air forcing mechanism for forcing air from the first enclosure into the second enclosure, whereby a laminar air flow is substantially produced just below the second enclosure means by actuating the air forcing mechanism.

In a preferred form of the robot traveling duct, the first enclosure means comprises an elongated partition wall for horizontally partitioning an inside of thereof to form a first tubular space above the partition wall and a second tubular space below the partition wall for enclosing the guide rail, the partition wall having an opening for allowing air in the first tubular space to enter into the second tubular space, wherein the air forcing means communicates to the second tubular space for forcing air in the second tubular space into the second enclosure means, and wherein the first enclosure means having opposite side wall, one side wall having the longitudinal opening communicating to the second tubular space. The air forcing means includes a blower mounted below the floor, an intake duct means for communicating the second tubular space to the blower for introducing air in the second tubular space to the blower, and discharge duct means for communicating the blower to the second enclosure means for discharging air from blower to an inside of the second enclosure, part of each of the intake duct means and the discharge duct means being arranged within corresponding pole members. The arrangement of the part of each of the intake duct means and the discharge duct means within corresponding pole members reduces the level of noises produced due to air streams in the discharge ducts 58 and the poles 70. Furthermore, such arrangement facilitates applying the invention to the conventional robot traveling duct, already built, in FIG. 1

DETAILED DESCRIPTION OF THE PREFERRED EMBODIMENTS

Figure 1:
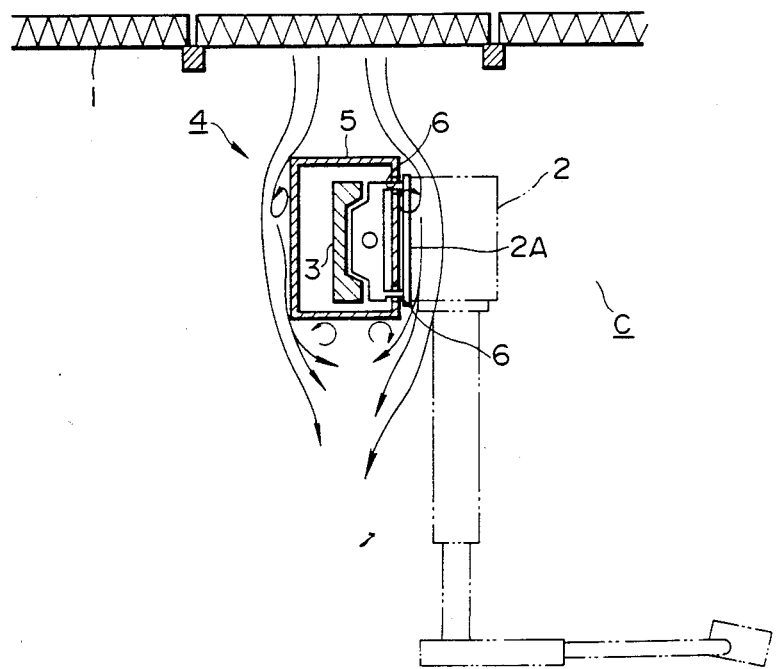
FIG. 1 is a vertical cross-section of the robot traveling duct of the prior art, the robot traveling duct being used in a clean room.
Figure 2:
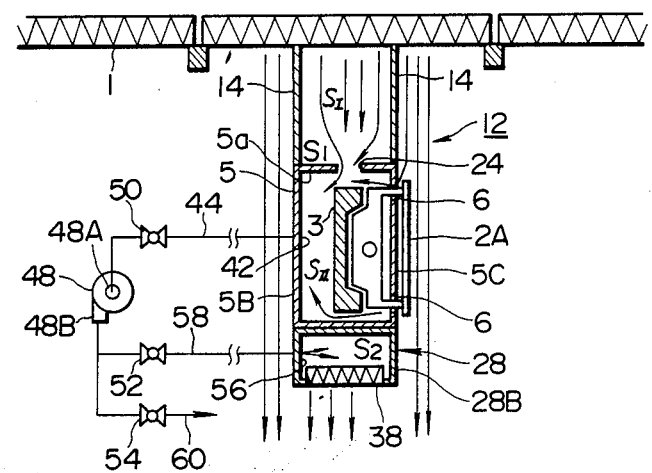
FIG. 2 is a vertical cross-section of a robot traveling duct of the present invention.
Figure 3:
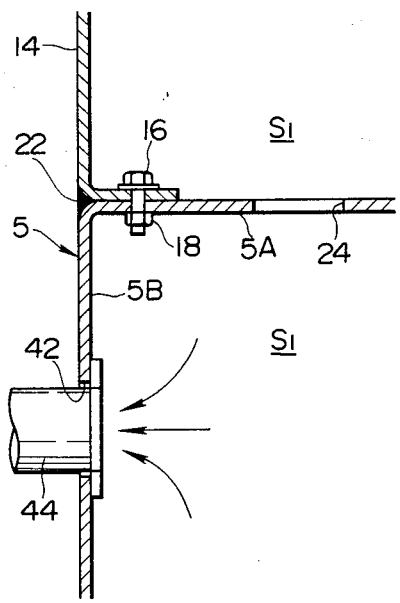
FIG. 3 is an enlarged fragmental view illustrating a joint portion of the first enclosure in FIG. 2.

Referring now to the drawings, like reference characters designate corresponding parts throughout several views, descriptions of corresponding parts are omitted after once given. In FIGS. 2 and 3, a robot traveling duct according to the present invention is illustrated and includes a first enclosure 12. The first enclosure 12 encloses a guide rail 3 and extends along it with a predetermined width. The first enclosure 12 has a generally rectangular cross-section and defines a first space S1. The robot traveling duct further includes a second enclosure 28 having a rectangular cross-section with a width equal to the width of the first enclosure 12. The second enclosure 28 is mounted on the bottom of the first enclosure 12 and defines a second space S2.

Figure 4:
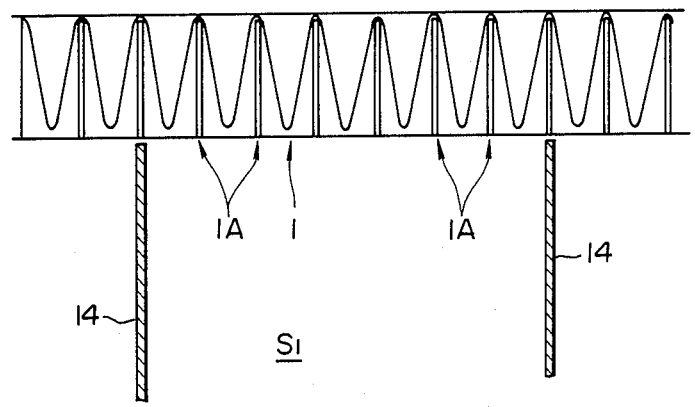
FIG. 4 is an enlarged diagrammatic illustration showing. a positional relationship between the side walls of the first enclosure in FIG. 2 and the ceiling filter.

The first enclosure 12 includes the guide rail duct 5 already stated and defining a first tubular space, in which the guide rail 3 are accommodated. The guide rail duct 5 has a slit formed longitudinally through its top plate 5A as a partition wall. Provided above the guide rail duct 5 is a pair of second tubular space defining side walls 14, 14 which are vertically mounted on the top plate 5A of the guide rail duct in parallel with each other and along the overall length of the guide rail 3. The side walls 14, 14 are mounted to the guide rail duct 5 so that the outer surface of each side wall 14 is flush with the outer surface of the corresponding side wall 5B, 5C of the guide rail duct 5. As shown in FIG. 3, the lower end of each second tubular space defining wall 14 has an elongated lower flange bent vertically to it. The lower flange is brought into abutment with the corresponding longitudinal periphery of the top plate 5A of the guide rail duct 5 and fastened to it with bolt 16 and nut 18 assemblies. Grooves 22, which are defined between the corners of lower ends of the second tubular space defining walls and the corresponding peripheries of the top plate of the guide rail duct 5, are filled with a caulking material so as to provide smooth outer faces to the first enclosure 12. Each of the second tubular space defining walls 14, 14 has at its upper end an upper flange (not shown), similar to the lower flange, and the upper flange thereof is fastened to the lower end of an aluminum separator of the ceiling filter 1 in the same manner as in the lower end thereof. Thus, the second tubular space defining walls and the top plate 5a of the guide rail duct 5 defines a second tubular space along the guide rail 3, the second tubular space opening at its top end to the ceiling filter 1. The upper end of each second space defining wall may be located closely to the lower end of the corresponding separator without being fastened to the latter as shown in FIG. 4. With such a construction, the first space S1 has the first and second tubular spaces communicated to each other through the slit 24.

The second enclosure 28, which is mounted on the bottom of the guide rail duct 5 along the whole length thereof, has a channel-shaped shell member 28A opening downwards. The second enclosure 28 is mounted at its web plate to the bottom plate 5C of the guide rail duct 5 by means of bolt and nut assemblies 30 and 32. The open ends of the second enclosure 28 is closed with a filter 38, and thus the second space S2 is defined. The filter 38 is of the same type as the ceiling filter 1.

Figure 5:
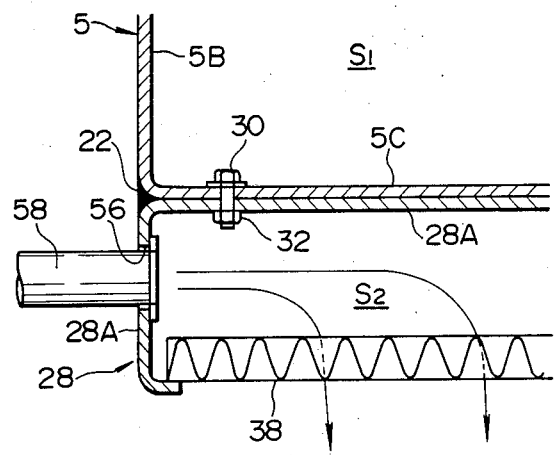
FIG. 5 is an enlarged fragmental vertical cross-section showing part of the second enclosure in FIG. 2.

One side wall 5B, which has no slits 6 formed through it, of the guide rail duct 5 has a plurality of openings 42 formed to be longitudinally arranged. An intake tube 44 is attached at its one end to the peripheral portion of a side wall 5B which portion defines the corresponding opening 42, and each intake tube 44 communicates through a manifold (not shown) and a damper 50 to an intake 48A of a blower 48. One flange, left hand in FIG. 5, of the channel member 28A of the second enclosure 28 is provided with a plurality of discharge openings 56 longitudinally arranged. A discharge tube 58 is jointed at one end to the one flange to communicate through each opening 56. Each discharge tube 58 is communicated through another manifold (not shown) and a damper 52 to the outlet 48B of the blower 48. The blower 48 may be located above the ceiling filter 1 or below the floor of the clean room.

In operation, air issues from the ceiling filter 1 in a conventional manner, and thus air which issues from the part, just above the guide rail duct 5, of the ceiling filter 1 enters the second tubular space of the first space S1 through the opening between the first tubular space defining walls 14. In this state, the blower 48 is actuated to draw air from the first space S1 through intake tubes 44 into it. During this operation, air which issues from the ceiling filter 1 and flows near the other side wall 5C of the guide rail duct 5 is sucked through slits 6, 6 into the first tubular space of the first space S1, and hence dusts which produced near the guide rail 3 due to the movement of the robot are effectively prevented from scattering into the clean room.

Air which issues adjacent to the outer surfaces of the second tubular space defining walls 14, 14 from the ceiling filter 1 smoothly flows along the walls 14, 14, the side walls 5B, 5B of the guide rail duct 5 and then the flanges of the second enclosure 28. Thus, the laminar air flow is effectively prevented from being disturbed in the presence of the guide rail duct 5.

The air which has been drawn by the blower 48 is discharged through the discharge duct 58 into the second space S2, from which it issues downwards through the filter 38 to form a stream of clean air just below the robot traveling duct 5. The laminar flow of the cleaned air along the opposite sides of the robot traveling duct is also effectively prevented from being disturbed at the lower corners thereof. The robot traveling duct is thus capable of not only preventing dusts from scattering from it in the clean room but also effectively keeping the state of laminar flow in the clean air.

The reference numeral 60 in FIG. 2 designates a relief line which may discharge part of the air from the blower 48, the relief line 60 being provided wit a damper 54. Control of the damper 54 enables to adjust the intake air flow from the first space S1 and the discharge amount of air to the second space S2. For example, control of the three dampers 50, 52, 54 by a conventional control unit including microprocessor (not shown) enables to correspond the intake air flow from the first space S1 to the discharge amount of air from the ceiling filter 1 into first space S1, and further it enables to regulate the discharge amount of the air into the second space S2 according to the intake air flow. With such control, a more preferable laminar flow state in the clean room is created.

A modified form of the robot traveling duct is illustrated in FIGS. 6A to 8, in which the modified robot traveling duct is supported on hollow pole members 70 erected on the floor at regular intervals, and in which discharge tubes pass through respective pole members with the blowers (not shown) arranged below the floor. In this modification, the guide rail duct 5 is not provided with intake openings 42 and the second enclosure 28 is not provided with the discharge openings 56.

Figure 6A:
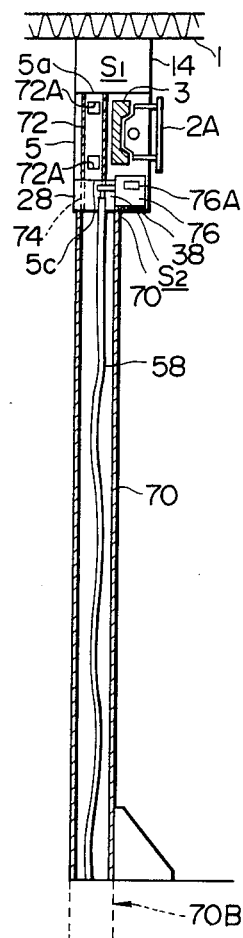
FIG. 6A is a diagrammatic vertical section of a modified form of the robot traveling duct in FIG. 2.
Figure 6B:
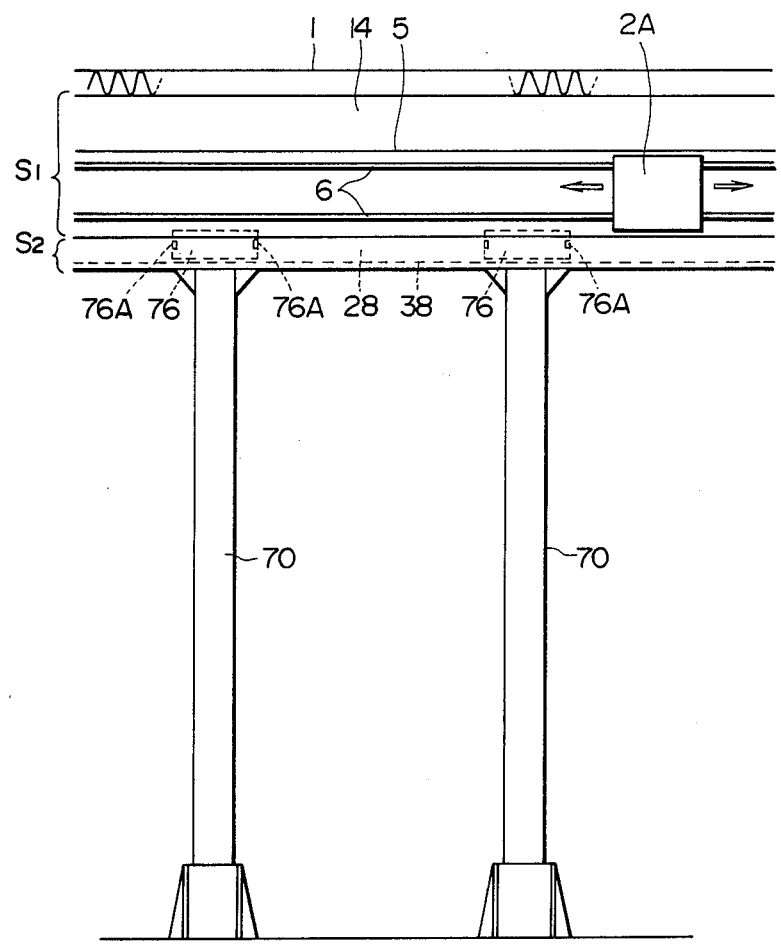
FIG. 6B is a view of the robot traveling duct in FIG. 6A as viewed from the right hand end thereof.
Figure 7:
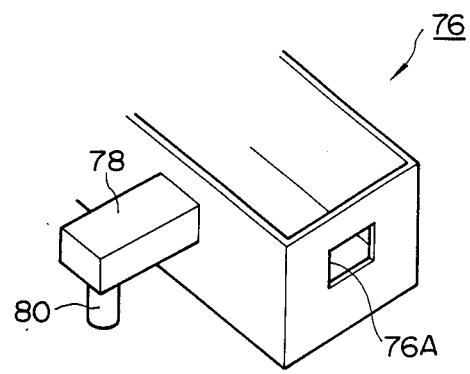
FIG. 7 is an enlarged fragmentary perspective view of the air accumulation chamber in FIG. 6A.
Figure 8:
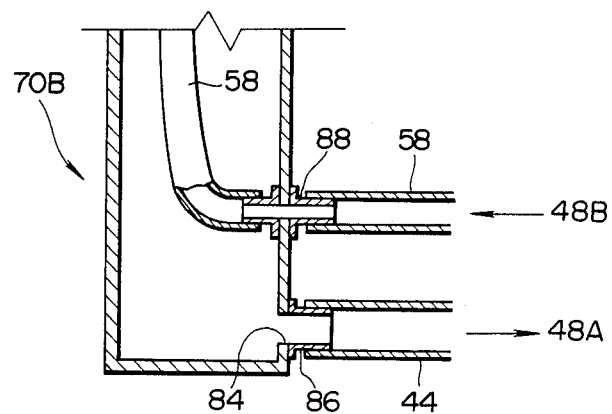
FIG. 8 is an enlarged vertical section of the lower end of each supporting pole member in FIG. 6A.

As shown in FIG. 6A, the guide rail duct 5 has a vertical intake pipe 72 arranged to pass through it with the upper end thereof opening to the first tubular space SA. The intake pipe 72 is provided with a pair of openings 72A, 72A which open to the inside of the guide rail duct 5. The intake pipe 72 is jointed at the lower end to a duct 74 which passes through the second enclosure 28 for communicating to the inside of the pole 70, and thus the first tubular space SI is communicated to the inside of the pole 70. The second enclosure 28 has rectilinear parallelepiped air accumulation chambers 76 arranged in it to correspond to respective poles 70. Each chamber 76 has a pair of chamber openings 76A formed at respective opposite end walls. The chambers 76 are each provided at its one side wall with an inverted L-shaped collar 78 for injecting air into it. The collar 78 has a lower leg 80 for connection with discharge tube 58. Although the top of the air accumulation chamber 76 in FIG. 7 is shown open for illustration purpose, it is closed and the top portion thereof project into the second tubular space SII as diagrammatically shown in FIG. 6A.

The lower end 70B of each supporting pole 70, which end is located below the floor of the clean room, has a through hole 84 formed through one circumferential wall thereof. The through hole 84 is surrounded with a collar 86 mounted to the one circumferential wall, and the intake tube 44, which communicates to the intake opening of the blower, is connected to this collar 86. Thus, each supporting pole 70 constitutes part of the intake pipe of the blower. Each of the discharge tube 58, one end of which is connected to the collar 78 of the corresponding chamber 76, passes through the bottom of the second enclosure 28, and then it extends substantially vertically within the pole 70. The discharge tube 58 passes through the one circumferential wall of the lower end 70B of the pole 70 with its joint pieces 88 to the outside of the pole 70. From the joint piece 88, the discharge tube 58 extends to the discharge opening of the blower. The upper end of the supporting pole 70 is closed with the bottom of the second enclosure 28 but it communicates to the lower end of the connecting duct 74.

In this modified robot traveling duct, air which has issued from the ceiling filter 1 into the first tubular space SI is drawn through the pipe 72 and the duct 74 into the pole 70 by actuating the blower since the latter evacuate air in the pole 70 through the hole 84. This also causes air in the guide rail duct 5 to low into the pipe 72 through openings 72A and 72A, and thus, air outside the guide rail duct 5 is drawn into the latter through the slits 6 and 6, so that dust produced at the guide rials 3 is caught and entrained in an air stream to the pipe 72, where the air stream joins another air stream from the first tubular space SI to the blower. The air which has been pumped from the blower is discharged into each chamber 76 via discharge duct 58 and is then injected into the second space S2 of the second enclosure 28 through the end openings 76A and 76A of the chamber 76 with a reatively high velocity, so that the air from the chamber 76 is uniformly distributed in the second enclosure 28. The air in the second space S2 issues downwards through the filter 38 into the clean room.

The structure of the modified robot traveling duct that the discharge ducts 58 are placed to extend through respective poles 70 as the intake duct provides both ease in applying the invention to the prior art robot traveling duct already built and excellent appearance to the robot traveling duct. Furthermore, such a structure reduces the level of noises produced due to air streams in the discharge ducts 58 and the poles 70.

When the ceiling 1 of the clean room is relatively low, the top plate 5a of the guide rail duct 5 may be omitted without substantially deteriorating the effects of the present invention.

What is claimed is:

1. A robot traveling duct for clean room in which a vertical laminar flow of air is produced from a ceiling filter toward a floor thereof, and in which the robot traveling duct is arranged within the clean room and below the ceiling filter and surrounds a guide rail of the robot, the robot traveling duct including a longitudinal opening for connection between the guide rail and the robot, comprising:

first enclosure means for enclosing the guide rail to extend along the guide rail, the first enclosure means including air intake means for introducing air, issuing from the ceiling filter, into the first enclosure means,;

second enclosure means mounted to the first enclosure means to be located below the first enclosure means, the second enclosure means including a second enclosure filter for filtering air therein and issuing the filtered air downwards into the clean room, the second enclosure extending along the guide rail and being equal in width to the first enclosure means; and air forcing means for forcing air from the first enclosure means into the second enclosure means, whereby a laminar air flow is substantially produced just below the second enclosure means by actuating the air forcing means.

2. A robot traveling duct as recited in claim 1, wherein the first enclosure means comprises an elongated partition wall for horizontally partitioning an inside of thereof to form a first tubular space above the partition wall and a second tubular space below the partition wall for enclosing the guide rail, the partition wall having an opening for allowing air in the first tubular space to enter into the second tubular space, wherein the air forcing means communicates to the second tubular space for forcing air in the second tubular space into the second enclosure means, and wherein the first enclosure means having opposite side wall, one side wall having the longitudinal opening communicating to the second tubular space.

3. A robot traveling duct as recited in claim 2, wherein the first enclosure means has an open upper end, the air intake means including the open upper end.

4. A robot traveling duct as recited in claim 3, further comprising supporting pole members each having an upper end and lower end and erected on the floor, for supporting the first and second enclosure means; wherein the second enclosure including a bottom having the second enclosure filter mounted thereto; wherein the the supporting pole members are attached at the upper ends to the bottom of the second enclosure; and wherein the air forcing means is provided in plural and each comprises a blower mounted below the floor, an intake duct means for communicating the second tubular space to the blower for introducing air in the second tubular space to the blower, and discharge duct means for communicating the blower to the second enclosure means for discharging air from blower to an inside of the second enclosure, part of each of the intake duct means and the discharge duct means being arranged within corresponding pole members.

5. A robot traveling duct as recited in claim 4, wherein a plurality of the pole members have a hollow shape to define the part of the intake duct means, wherein the intake duct means comprises an intake air guide conduit sealingly passes through both the second tubular space and the second enclosure means for communicating the first tubular space via the opening of the partition wall to the part of the intake duct means, the intake air guide conduit having an opening for communicating the second tubular space thereof.

* * * * *